US005434038A

United States Patent [19]

Bohan et al.

[11] Patent Number: 5,434,038

[45] Date of Patent: Jul. 18, 1995

[54] PHOTOGRAPHIC IMAGE DISPLAY MATERIAL

[75] Inventors: Anne E. Bohan, Rochester; Jerzy A. Budz, Fairport; Pamela M. Ferguson, Farmington; Alberto M. Martinez, Rochester; James P. Merrill, Rochester; Scott F. O'Dell, Rochester; Richard P. Szajewski, Rochester, all of N.Y.

[73] Assignee: Eastman Kodak Company, Rochester, N.Y.

[21] Appl. No.: 220,989

[22] Filed: Mar. 31, 1994

[51] Int. Cl.$^{6}$ .................... G03C 1/46

[52] U.S. Cl. .................... 430/503; 430/567; 430/570; 430/581; 430/583

[58] Field of Search .................... 430/503, 567, 583, 581, 430/570, 502

[56] References Cited

U.S. PATENT DOCUMENTS

| | | | |
|---|---|---|---|
| 4,952,491 | 8/1990 | Nishikawa et al. | 430/570 |
| 5,206,124 | 4/1993 | Shimazaki et al. | 430/502 |
| 5,264,337 | 11/1993 | Maskasky | 430/567 |
| 5,275,930 | 1/1994 | Maskasky | 430/567 |
| 5,292,632 | 3/1994 | Maskasky | 430/567 |
| 5,320,938 | 6/1994 | House et al. | 430/567 |

FOREIGN PATENT DOCUMENTS

| | | |
|---|---|---|
| 0534395 | 3/1993 | European Pat. Off. . |

*Primary Examiner*—Charles L. Bowers, Jr.
*Assistant Examiner*—Geraldine Letscher
*Attorney, Agent, or Firm*—Paul A. Leipold

[57] ABSTRACT

An improved image display material comprising a light sensitive tabular grain silver chloride emulsion spectrally sensitized to a peak wavelength of less than about 475 nm, and a method of use comprising the step of optically printing a color image onto the improved color photographic display material is provided. The material and method enable reduced printing times, improved color reproduction and lowered image granularity.

11 Claims, 2 Drawing Sheets

PHOTOGRAPHIC IMAGE DISPLAY MATERIAL

FIELD OF THE INVENTION

This invention relates to a photographic element having improved color reproduction and lowered image granularity. This, in particular, relates to a method of doing this by controlling blue sensitivity.

BACKGROUND OF THE INVENTION

Optical printing of an originating color image borne on a transparent support onto a light sensitive color photographic display material can be accomplished by positioning the originating image between a light source and the light sensitive color photographic display material. Most generally, incandescent bulbs are employed as the light source for optical printing. Such incandescent bulbs are typically deficient in blue light relative to red or green light.

Light sensitive color photographic display materials such as color papers generally comprise a support bearing at least one red light-sensitive layer capable of forming a cyan colored image, at least one green light-sensitive layer capable of forming a magenta colored image and at least one blue light-sensitive layer capable of forming a yellow colored image, all as a result of appropriate chemical processing. These materials typically have a layer order such that a blue sensitive layer is further from an exposure source and closer to a support than other light sensitive layers. This layer order is dictated, inter alia, by the low acuity of the human eye to fine details in yellow images. Since the components in the overlying layers may scatter, reflect or absorb blue light, the blue light sensitive layer tends to receive less useful exposure than do overlying red or green light sensitive layers all other factors being equal.

Light sensitive color photographic originating materials, as typified by color negative films, comprise a support bearing at least one red light-sensitive layer capable of forming a cyan colored image, at least one green light-sensitive layer capable of forming a magenta colored image and at least one blue light-sensitive layer capable of forming a yellow colored image, all as a result of appropriate chemical processing. The chromogenic dyes formed in such a color film are far from perfected and exhibit undesired blue densities in addition to the desired red or green density. This limits the useful light available for exposure of the blue sensitive layer of a display material such as a color paper during a printing process.

Color negative films additionally incorporate integral color masking couplers, as described by Hanson and Vittum in the Photographic Society of America Journal, vol. 13, 94-ff (1947). Specifically, magenta dye-forming image couplers which release a yellow dye in an imagewise fashion while forming a magenta image dye may be employed in a green light sensitive layer of a color negative film to effectively reduce the imagewise formation of unwanted blue density in that layer while simultaneously providing a high but uniform blue density. Similarly, cyan dye-forming, yellow dye releasing masking couplers and so-called colorless or fugitive dye forming yellow dye releasing couplers are also known. While these masking couplers can improve system color reproduction by lowering the degree of undesired imagewise density formation in the color negative film, they inherently increase the blue density of a Dmin region of the color negative film. The result is that color reproduction can be improved but at a further cost in the useful blue exposure available to, for example, a color paper.

This situation is further complicated by the commercial need to maintain compatibility between different brands of color negative originating films, for example, and different offerings of these color films from a common manufacturer, at least when these films are intended for automated printing. Practically, this means that color negative films are formulated such that a camera normal exposure of a ca. 18% gray chart produces, after photographic processing, a fixed relationship between the red, green and blue densities that go into forming the image of this gray chart. The result of these practical constraints is that the individual color densities after a normal exposure and processing typically increase in the order red - green - blue, with blue the highest. This translates into the blue Dmin in a color negative film being highest and the blue transmission of the color negative being the smallest, all of which then places an even higher burden on the blue light sensitivity or speed of a color paper.

As a result of these factors the blue layer sensitivity of, for example, a color paper, dictates the overall useful sensitivity of such a photographic display material.

Attempts to remedy this difficulty by providing color display materials with higher blue sensitivity have generally proven unsuccessful. Although ever larger symmetric silver chloride and silver bromochloride may be precipitated and sensitized, these emulsions are known to gain little additional sensitivity with increased size, as has been reported by Farnell and Chanter in the Journal of Photographic Science, vol. 9, 73-ff (1961). An additional difficulty encountered with these symmetric emulsions, whatever their size, is a failure to show appropriately higher response as a function of increased exposure intensity, a problem known colloquially as High Intensity Reciprocity Failure (HIRF). This HIRF problem generally prevents achievement of meaningful improvements in printing time by increasing the intensity of the exposure source in a printing apparatus. Furthermore, these larger grains tend to exhibit poorer developability and covering power than the smaller grains thus limiting the optical density and the degree of color saturation that can be formed in the display material.

Recently, tabular shaped silver chloride emulsions have been reported by House et al at U.S. Pat. No. 5,320,938, and by Maskasky at U.S. Pat. No. 5,264,337 and U.S. Pat. No. 5,292,632. While these grains are said to provide improved sensitivity, there is little known about the specific use of such grains in color display materials, and no indication that these emulsions should specifically be employed in the blue light sensitive layer of a color display material in combination with specifically chosen spectral sensitizing dyes.

PROBLEM TO BE SOLVED BY THE INVENTION

For all of these reasons, a practical blue light sensitive layer in a color display material exhibiting both excellent and spectrally distinct photographic sensitivity has never been available. Thus, an unmet need exists for light sensitive color photographic display materials that provide both good color reproduction and adequate sensitivity while allowing fast printing times.

SUMMARY OF THE INVENTION

These problems are overcome by providing:

a photographic element comprising a support bearing a blue light sensitive layer a green light sensitive layer and a red light sensitive layer;

wherein said blue light sensitive layer comprises a tabular silver halide grain emulsion having an average equivalent circular diameter of about 0.3 to 2.5 microns and an average aspect ratio greater than about 2, said halide comprising greater than about 95 mol percent chloride, said tabular silver halide being spectrally sensitized with a blue sensitizing dye providing a peak blue sensitivity at between about 440 and 475 nanometers; and wherein said peak blue sensitivity is separated from the peak green layer sensitivity by greater than about 75 nanometers.

In another embodiment, these problems are overcome by:

a method of providing viewable images comprising:

providing a color negative film having a quantity of yellow masking dye that reduces the transmission of blue light by less than about 75 percent; wherein said color negative film has a blue gamma-normalized granularity of less than about 0.06 at a blue density 0.15 above Dmin after exposure and processing; and wherein said color negative film has a Dmin blue density less than about 1.0 after processing;

passing light through said negative to expose a photographic element;

said photographic element comprising a support bearing a blue light sensitive layer a green light sensitive layer and a red light sensitive layer;

wherein said blue light sensitive layer comprises a tabular silver halide grain emulsion having an average equivalent circular diameter of about 0.3 to 2.5 microns and an average aspect ratio greater than about 2, said halide comprising greater than about 95 mol percent chloride, said tabular silver halide being spectrally sensitized with a blue sensitizing dye providing a peak blue sensitivity at between about 440 and 475 nanometers; and wherein said peak blue sensitivity is separated from the peak green layer sensitivity by greater than about 75 nanometers.

ADVANTAGEOUS EFFECT OF THE INVENTION

The current invention provide an improved image display material and image forming methods that enables reduced printing times, improved color reproduction and surprisingly lowered image granularity, as well as many other benefits that will become clear from the ensuing discussion.

DETAILED DESCRIPTION OF THE INVENTION

Figure 1:
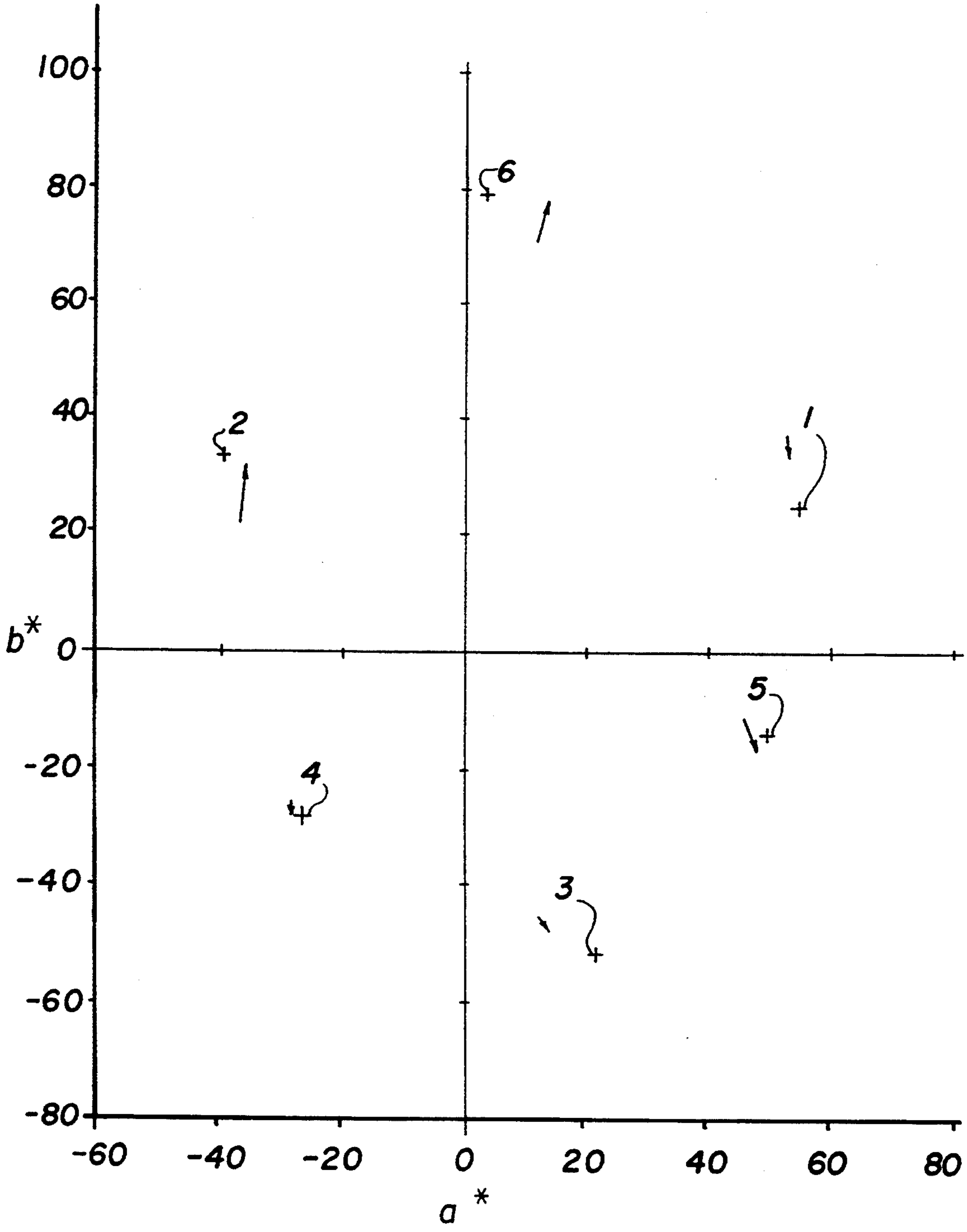
FIG. 1 shows CIELAB mapping of color negative film example N01 when printed onto a color paper.

The invention will now be described in greater detail. Red or red light generally means actinic radiation or light of a wavelength of between about 600 and 750 nm, green or green light generally means light of a wavelength between about 500 and 600 nm while blue or blue light generally means light have a wavelength of between about 400 and 500 nm. In the same vein, dyes which primarily absorb red light are refered to as cyan dyes, dyes which primarily absorb green light are referred to as magenta dyes and dyes which primarily absorb blue light are referred to as yellow dyes. Unless otherwise indicated, dye densities are reported as Status M densities the measurement of which is described at T. H. James, Ed., "The Theory of the Photographic Process," Macmillan, New York, 1977, 4th edition, pages 520–521.

The term photographic image display material includes any light sensitive photographic material suitable for direct viewing by reflected light such as a color photographic paper; direct viewing by transmitted light such as a color photographic advertising transparency; or suitable for projected viewing such as a color photographic motion picture print film. Also included are those related materials typically employed as intermediate films suitable for preparing multiple copies of a display material.

Most generally, these photographic display materials will comprise a red light sensitive color record capable of forming a cyan dye deposit, a green light sensitive color record capable of forming a magenta dye deposit and a blue light sensitive color record capable of forming a yellow dye deposit. The red light color record will typically have a peak sensitivity at about 700 nm, and the green light color record will typically have a peak sensitivity at about 550 nm. The peak sensitivity of the blue light color record useful in the practice of the current invention will be discussed in detail below. The dye deposits will typically be formed during a development step which comprises contacting the display material with a basic solution and a paraphylene diamine development agent to reduce silver halide to silver metal with concomitant production of an oxidized form of color developer. This oxidized color developer in turn reacts with a photographic coupler to form the chromogenic cyan, magenta and yellow dye images, all as known in the art. The coupler may be introduced into the material during processing but is preferably present in the material before exposure and processing. The couplers may be monomeric or polymeric in nature. The development step may be amplified by the presence of peroxides as known in the art. The display material may then be optionally desilvered using any technique known in the art. The display image may be borne on a reflective support, such as that used in color papers or on a transparent support such as that used in motion picture projection films. The components, assembly and processing of color photographic display materials are described in detail at Research Disclosure Item 17643, 1978; Item 18716, 1979; and Item 308119, 1989, all published by Kenneth Mason Publications, Ltd., The Old Harbormaster's 8 North Street, Emsworth, Hampshire P010 7DD, England, the disclosures of which are incorporated by reference. Materials and methods useful in the preparation of color photographic display materials are additionally described at T. H. James, Ed., "The Theory of the Photographic Process," Macmillan, New York, 1977; "The Kirk-Othmer Encyclopedia of Chemical Technology," John Wiley and Sons, New York, 1993; Neblette's "Imaging Processes and Materials," Van Nostrand Reinhold, New York, 1988; and Keller, Ed. "Science and Technology of Photography, VCH, New York, 1993. Materials useful in the preparation of color papers are further illustrated by current commercial practice as, for example, by EDGE TM, PORTRA TM or SUPRA TM, Color Papers as sold by Eastman Kodak Company, by FUJI TM FA-family Color Papers as sold by Fuji Photo Film, by KONICA TM QA-family Color Papers as sold by Konishiroku Industries, by EASTMAN TM COLOR PRINT motion picture projection film as sold be Eastman Kodak Company, by AGFA TM MP-family motion picture print films as sold by Agfa-Gevaert, by DURATRANS TM and DURACLEAR TM display films as sold by Eastman Kodak Company and by KONSENSUS-II TM display films as sold by Konishiroku Industries. The advantages of current invention may be achieved by modifying any of these formulations to conform to the requirements set forth in the specification. The exact magnitude of the benefits achieved will, of course, depend on the exact details of the formulations involved but these will be readily apparent to the skilled practitioner.

It is contemplated that the color display material and specifically the color paper according to the present invention will further comprise ultraviolet absorber dyes and soluble dyes removed during processing, all as known in the art. Additionally, the color display material may comprise a substituted pyrazolotriazole or a substituted 3-aminopyrazolone magenta dye-forming image coupler which may be a four equivalent coupler but is preferably a two equivalent coupler. The term "equivalent" indicates the formal stoichiometric relationship between-the number of moles of silver reduced per mole of image dye formed in a coupling reaction. The couplers and coupler mixtures described at U.S. Pat. Nos. 5,091,297; 5,270,153; 4,675,280; 4,755,455; 4,954,431; 5,110,718; 5,084,375; 4,600,688; 4,443,536; and 4,830,955 are additionally useful in the practice of this invention.

Any tabular shaped silver chloride emulsion comprising at least 50 mol percent chloride, based on total halide, known in the art may be used in the blue light sensitive layer of the photographic image display material. Image formation and desilvering of the display material are best carried out when the emulsion comprises greater than about 95 mol percent chloride. A chloride content of greater than about 97 mol percent is even more preferred. Iodide ion may be incorporated in the emulsion in any manner known in the art. In particular, iodide may advantageously be present or added during emulsion grain preparation, particularly during the grain nucleation and grain growth steps, and during grain sensitization. When iodide ion is added during a grain growth step it may be added continuously as an iodide run or may be added at discrete times as an iodide dump. The iodide my be supplied as soluble iodide ion or as a sparingly soluble salt. Total emulsion iodide content should be less than about 5 mol percent and preferably less than about 3 mole percent to ensure good development and desilvering characteristics. The remainder of the emulsion halide may be bromide which can be incorporated in any manner known in the art. The emulsion may be sensitized, doped or treated with various metals as known in the art, including iron, sulfur, selenium, iridium, gold, platinum or paladium so as to modify or improve its properties.

Tabular silver chloride emulsions having an average equivalent circular diameter of between about 0.3 and 2.5 microns are advantageously employed in the practice of this invention. Grains of smaller diameters tend to not exhibit adequate sensitivity while grains of larger diameter may be excessively sensitive to both ambient light present during printing and processing and prone to providing inadequate covering power to dye deposits formed therefrom. Grains having an average equivalent circular diameter of between about 0.4 and 2.0 microns are more preferred, while those having an average equivalent circular diameter between about 0.5 and 1.7 microns are most preferred. The grains should have an average aspect ratio greater than about 2 so as to provide both good surface area per grain and low incorporated silver per grain thereby simultaneously enabling adequate sensitivity and good covering power. For these reasons grains having an average aspect ratio greater than about 5 are more preferred while those having an average aspect ratio of between about 8 and 20 are most preferred. As the average equivalent circular diameter of the grains increase, it is advantageous to further limit the total quantity of silver incorporated per grain so as to continue to promote good sensitivity and good covering power in dye deposits. For these reasons, the average grain thickness of the tabular silver chloride grains should be less than about 0.35 microns, preferably less than about 0.3 microns and even more preferably less than about 0.25 microns. While the tabular silver chloride grains can have any distribution of grain sizes around these average sizes, it is preferred that the coefficient of variation in size be less than about 70 percent, more preferred that it be less than about 50 percent and even more preferred that it be less than about 30 percent so as to promote homogeneous sensitivity and development leading to more pleasing images.

The tabular silver chloride grains useful in this invention can have any surface morphology known in the art. Tabular silver chloride grains having {100} major faces are preferred since these grains are both morphologically stable and capable of being readily sensitized with a variety of sensitizing dyes. Tabular silver chloride grains having {111} major faces and requiring the presense of either organic surface stabilizers or tightly adhered sensitizing dyes are less preferred since these organic species can interfere with later development and desilvering steps. Silver chloride emulsions characterized by at least 50 percent of the grain population projected area being accounted for by tabular grains (1) bounded by {100} major faces having adjacent edge ratios of less than 10 and (2) each having an aspect ratio of at least 2, as described by House et alia at U.S. Pat. No. 5,320,938, and by Maskasky at U.S. Pat. No. 5,264,337 and U.S. Pat. 5,292,632, the disclosures of which are incorporated by reference, are most preferred in the practice of this invention.

The silver chloride tabular grains useful in the practice of this invention may be spectrally sensitized in the blue region using any technique and any spectral sensitizing dye or combination of dyes known in the photographic arts provided the peak blue spectral sensitivity of the spectrally sensitized tabular silver chloride emulsion is between about 440 nm and 475 nm. It is more preferred that the blue spectral sensitization be between about 445 nm and 473 nm, and most preferred that it be between about 450 nm and 471 nm. The blue spectral sensitivity ranges useful in the practice of the invention follow from the surprising discovery that overall color reproduction of a scene photographed on a color negative film and subsequently printed on such a color photographic display material exhibits improved hue and chromaticity.

Any spectral sensitizing dye having a peak spectral sensitivity between 440 and 475 nm may be utilized in the invention. Chemical structures of preferred sensitizing dyes SBD-1 through SBD-10 useful in the practice of this invention are shown below.

It is now believed that the improved color reproduction arises because as the blue sensitivity of the example color paper is changed to shorter wavelengths, the paper records less of the unwanted yellow density associated with the cyan or magenta color records of the color negative film as being related to blue light exposure of the color negative film. The result is a greater purity in color reproduction.

The degree of separation in the spectral sensitivities of the blue and green light sensitive color records in the color photographic display material is important in achieving the results of the current invention. Typically, in a color paper, the red light sensitive color record will have a peak sensitivity at about 700 nm, and the green light sensitive color record will have a peak sensitivity at about 550 nm. From this, and the earlier discussion, it follows that the blue light sensitive color record of a color paper useful in the practice of the invention will have a peak sensitivity at a wavelength at least about 75 nm different than the green light sensitive color record of the color paper. Even larger separations will be more preferred. These larger separations have not been attainable to date in practical systems because of the lack of blue light availability at these shorter wavelengths and the absence of suitable emulsions.

Any color originating material and in particular any color negative film exhibiting the characteristics recited below may be employed in the practice of this invention. The color negative films useful in the practice of this invention typically comprise a support bearing a red light sensitive color record capable of forming a cyan dye deposit, a green light sensitive color record capable of forming a magenta dye deposit and a blue light sensitive color record capable of forming a yellow dye deposit. The dye deposits will typically be formed during a development step which comprises contacting the color negative film with a basic solution and a paraphylene diamine color developing agent which reduces exposed silver halide to metallic silver and is itself oxidized. The oxidized color developing agent in turn reacts with a photographic coupler to form the chromogenic cyan, magenta and yellow dye images, all as known in the art. The coupler may be introduced into the film during processing but is preferably present in the film before exposure and processing. The coupler may be monomeric or polymeric in nature. The color negative film may then be optionally desilvered using any technique known in the art. The image thus formed is borne on a support that is sufficiently transparent to enable the subsequent color printing step of the invention. The components, assembly and processing of color negative films is described in detail at Research Disclosure Item 17643, 1978; Item 18716, 1979; and Item 308119, 1989, all published by Kenneth Mason Publications, Ltd., The Old Harbormaster's 8 North Street, Emsworth, Hampshire P010 7DD, England, the disclosures of which are incorporated by reference. The color negative films and display elements described herein may additionally be developed, bleached, and fixed using any of the solutions, components, and sequences described in copending U.S. patent application Ser. No. 08/035,347 by Buchanan et al filed Mar. 22, 1993, the disclosures of which are incorporated by reference. Materials and methods useful in the preparation of color negative films are additionally described at T. H. James, Ed., "The Theory of the Photographic Process," Macmillan, New York, 1977; "The Kirk-Othmer Encyclopedia of Chemical Technology," John Wiley and Sons, New York, 1993; Neblette's "Imaging Processes and Materials," Van Nostrand Reinhold, New York, 1988; and Keller, Ed. "Science and Technology of Photography, VCH, New York, 1993. Typically color negative films illustrating art recognized practice in the layer order, formulation, manufacture and in the selection and use of components for color negative films include Gold Plus 100, Gold Ultra 400, Ektar 25, Ektar 1000, Vericolor III, Eastman High Speed Motion Picture Film all manufactured and sold by Eastman Kodak Company, SH-100, SH-400 and SH-800 color negative films all manufactured and sold by Fuji Photo Film. The advantages of current invention may be achieved by modifying any of these formulations to the extend necessary to conform to the requirements set forth in the specification. The exact magnitude of the benefits achieved will, of course, depend on the exact details of the formulations involved but these will be readily apparent to the skilled practitioner.

Color negative films useful in the practice of the current invention may additionally incorporate integral color masking couplers, including yellow masking couplers as described originally by Hanson and Vittum in the Photographic Society of America Journal, Vol. 13, 94-ff (1947) and as disclosed in the previously cited general references. The term yellow masking coupler means any compound that enables a reduction in blue density attributable to a dyestuff associated with that compound in a photographic layer as a function of increased exposure level and increased development of that photographic layer. The yellow masking couplers useful in the practice of this invention include any of the yellow masking couplers known in the art. Specifically contemplated are those described in the general descriptions of color originating films disclosed above and those employed commercially as, for example, in the specific color negative films mentioned earlier. The term coupler generally means a compound capable of reacting in a basic environment with the oxidized form of a paraphenylene diamine color developing agent to form a chromogenic dye. The coupler can form any chromogenic dye and specifically a chromogentic cyan dye, a chromogenic magenta dye, a chromogenic black dye or even a chromogenic yellow dye. The dye formed can remain in the film structure to provide density or can be any of the known structures that either decolorize as a result of chemical interaction or are sufficiently solubilized so as to be removed from the film structure during processing. For the purposes of this specification, the term yellow masking coupler additionally includes compounds that can release, form or liberate the yellow mask or dyestuff by a cross oxidation process with oxidized color developer or by direct interaction with reducible silver halide, including substituted hydrazide release compounds, substituted hydroquinone release compounds and such, all as known in the art. The yellow masking coupler can be yellow before processing or it can be of another color that changes to yellow only after processing, such as a metal coordination compound or a blocked latent-yellow dye. The yellow mask or dyestuff liberated during photographic processing can be solubilized and removed from the color originating material during processing or can remain in the color negative material and lessen in blue density only after liberation. Also contemplated are those known compounds that are latent-yellow before processing and form blue density in an anti-imagewise fashion during processing. Specifically contemplated are magenta dye-forming image couplers which release a yellow dye in an imagewise fashion while forming a magenta image dye may be employed in a green light sensitive layer of a color negative film to effectively reduce the imagewise formation of unwanted blue density in that layer while simultaneously providing a high but uniform blue density. Similarly, cyan dye-forming, yellow dye releasing masking couplers and so-called colorless or fugitive dye forming yellow dye releasing couplers are also known and specifically contemplated.

While these masking couplers can improve system color reproduction by lowering the degree of undesired imagewise density formation in the color negative film, they inherently increase the blue density of a Dmin region of the color negative film. The result is that color reproduction can be improved but at a further cost in the useful blue exposure available to, for example, a color paper. As is demonstrated in the following Examples, reduction of the quantity of color masking coupler when printing onto a color display material of the current invention leads not only to improvements in printing speed but also to an unexpected improvement in blue layer granularity.

For this reason, use of limited quantities of yellow masking coupler in the color negative film are especially desired in the practice of this invention. Since various masking couplers provide differing amounts of blue density and simultaneously reduce blue light transmission through such a color negative film, all as governed by the exact chemical structure of the masking coupler, it is most convenient to define the limiting quantities of masking coupler by the reduction of blue light transmission attributable to these masking couplers at a Dmin region of the color negative film. A reduction in blue light transmission of less than about 75 percent due to the presence of masking couplers is useful in the practice of this invention, a reduction in blue light transmission by less than about 70 percent is preferred and a reduction in blue light transmission less than about 65 percent due to the presence of masking couplers is most preferred. Although color negative films totally lacking in masking coupler are believed to provide adequate color reproduction when used according to the current invention, a minimum 15 percent reduction in blue light transmission due to the presence of masking couplers represents a preferred position. The color negative film should additionally have a Dmin Status M blue density of less than about 1.1 and preferrably a Dmin blue density of less than about 1.0 or most preferrably a Dmin blue density of less than about 0.9 to fully show the advantages of the current invention.

The surprisingly lowered granularity mentioned earlier may also be quantified and leads to a further indication of the useful practice of the invention. The Status M blue Dmin, and the Status M blue gamma-normalized granularity at 0.15 density units above the blue Dmin following a sensitometric exposure and processing of the color negative film of other photographic color originating material measured following the procedure described at U.S. Pat. No. 5,135,839, column 125, line 23, to column 126, line 17. This density is chosen because it corresponds to the Blue layer speed point according to ANSI standards for setting color film sensitivities and thus is a well-monitored exposure and density level. The color photographic originating films, and in particular color negative films, useful in the practice of the current invention will show a gamma-normalized blue granularity of less than about 0.06 at this blue density, and preferably will show a gamma-normalized blue granularity of less than 0.055, but most preferably will show a blue layer gamma-normalized granularity of less than about 0.05 at this blue density.

Color negative films useful in this invention will additionally include development inhibitor releasing compounds, development accelerator releasing compounds, image dye-forming couplers, scavengers, pre-formed dyes and such all as know in the art and as exemplified in the art practice and references cited above and below.

Any magenta dye-forming coupler useful in color photography may be employed in the light sensitive color negative films and photographic elements of this invention. The magenta dye-forming couplers to be employed in the light sensitive color negative films of this invention include the optionally substituted:

3-amidopyrazoles [generically Class-I and specifically coupler M-4 whose structure is shown in the examples];

pyrazolotriazoles [generically Class-II and specifically couplers M-2 and M-3 whose structures are shown in the examples, and the pyrazolotriazole couplers disclosed in U.S. Pat. No. 5,254,446, incorporated by reference]; and 3-aminopyrazoles [generically Class-III and specifically M-1].

The useful 3-amidopyrazole [Class-I] couplers are represented by the structure:

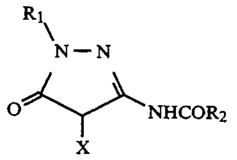

where $R_1$ and $R_2$ represent optionally substituted alkyl, aryl, or heterocyclic groups, which may be the same or different;

and X represents a hydrogen atom or an atom or group capable of splitting off upon reaction with an oxidation product of a color developing agent.

The useful pyrazoloazole [Class-II] couplers are represented by the structure:

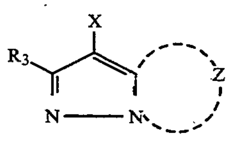

where $R_3$ represents a hydrogen atom or an optionally substituted alkyl, aryl, or heterocyclic group;

X represents a hydrogen atom or an atom or group capable of splitting off upon reaction with an oxidation product of a color developing agent;

and Z represents a group of nonmetal atoms necessary to form a nitrogen atom containing heterocycle, which may have a substituent.

The useful 3-aminopyrazole [Class-III] couplers are represented by the structure:

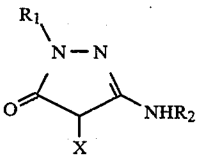

where $R_1$ and $R_2$ represent optionally substituted alkyl, aryl, or heterocyclic groups, which may be the same or different;

and X represents a hydrogen atom or an atom or group capable of splitting off upon reaction with an oxidation product of a color developing agent.

Image dyes formed from Class-I magenta dye-forming image couplers are art recognized to show higher blue density than do those formed from Class-II or Class-III image couplers. For this reason Class-I magenta dye-forming image couplers generally required higher degrees of yellow density masking in order to provide desired color reproduction properties. As is shown by comparative data below, higher levels of yellow density masking generally result in inferior blue layer granularity in a color negative material. The lambda max and bandwidths associated with dyes formed from these coupler classes is such that less yellow masking may be employed for Class-III and Class-II image couplers. Mixtures of these couplers may be employed as known in the art to provide additional benefits such as improved dye hue, improved stability, improved physical properties, and improved image to fog discrimination.

Any cyan dye-forming coupler useful in color photography may be employed in the light sensitive color negative films and photographic elements of this invention. The cyan dye-forming couplers to be employed in the light sensitive color negative films of this invention preferably include the optionally substituted:

phenols [generically Class-IV, specifically coupler C-1 whose structure is shown in the examples];

2-substituted-1-naphthols [generically Class-V, specifically coupler C-2 whose structure is shown in the examples]; and 2,5-disubstituted-1-naphthols and 2-(disubstituted carboxyanalide)-1-naphthols [generically Class-VI, and specifically C-3 whose structure is shown in the examples].

The useful phenol [Class-IV] couplers are represented by the structures:

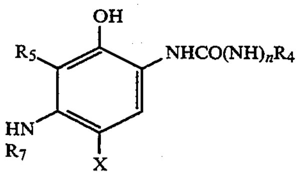

or

-continued

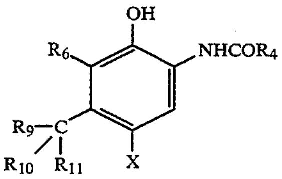

where $R_4$ represents an optionally substituted alkyl, aryl, or heterocyclic group;

$R_5$ and $R_6$ each represents a hydrogen atom, a halogen atom, an alkyl group or any acylamino group, or $R_5$ may represent a non-metallic atomic group necessary to form a nitrogen containing 5- or 6-membered ring together with $R_7$;

$R_7$ represents $COR_8$ or $SO_2R_8$;

$R_8$ represents an optionally substituted alkyl, aryl, or heterocyclic group;

$R_9$, $R_{10}$, and $R_{11}$ which may be the same or different, each represents a hydrogen atom or an optionally substituted alkyl, aryl, or heterocyclic group;

n is 0 or 1;

and X represents a hydrogen atom or an atom or group capable of splitting off upon reaction with an oxidation product of a color developing agent.

The useful 2-substituted-1-naphthol [Class-V] couplers useful in the practice of this invention are represented by the structure:

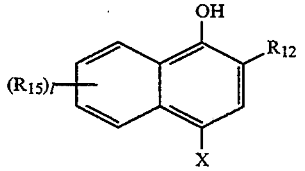

where $R_{12}$ represents $—CONR_{13}R_{14}$, $—SO_2NR_{13}R_{14}$, $—NHCOR_{13}$, $—NHCOOR_{13}$, $—NHSO_2R_{13}$, $—NHCONR_{13}R_{13}$, or $—SO_2NR_{13}R_{14}$;

where $R_{13}$ and $R_{14}$ may be the same or different and represent hydrogen, or an optionally substituted alkyl, aryl, or heterocyclic group comprising between 2 and 30 carbon atoms;

$R_{15}$ represents a substituent for the naphthalene ring and 1 is 0, 1, 2, or 3;

and X represents a hydrogen atom or an atom or group capable of splitting off upon reaction with an oxidation product of a color developing agent.

The 2,5-disubstituted-1-naphthol and 2-(disubstituted carboxyanalide)-1-naphthol [Class-VI] couplers useful in the practice of this invention are represented by the structures:

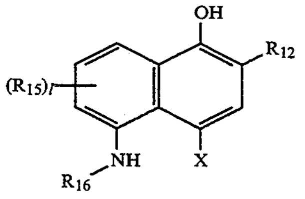

or

-continued

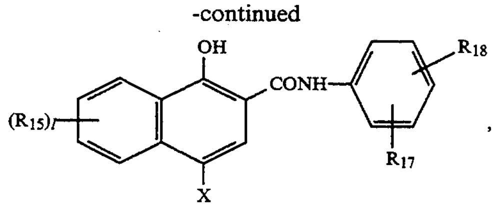

where $R_{12}$ represents $-CONR_{13}R_{14}$, $-SO_2NR_{13}R_{14}$, $-NHCOR_{13}$, $-NHCOOR_{13}$, $-NHSO_2R_{13}$, $-NHCONR_{13}R_{13}$, or $-SO_2NR_{13}R_{14}$;

where $R_{13}$ and $R_{14}$ may be the same or different and represent hydrogen, or an optionally substituted alkyl, aryl, or heterocyclic group comprising between 2 and 30 carbon atoms;

where $R_{15}$ represents a substituent for the naphthalene ring which may optionally form a ring with $R_{16}$;

l is 0, 1, 2, or 3;

$R_{16}$ represents $-CONR_{13}R_{14}$, $-SO_2NR_{13}R_{14}$, $-NHCOR_{13}$, $-NHCOOR_{13}$, $-NHSO_2R_{13}$, $-NHCONR_{13}R_{13}$, or $-SO_2NR_{13}R_{14}$; where $R_{13}$ and $R_{14}$ are as defined above;

$R_{17}$ and $R_{18}$ may be the same or different and represent substituents for the phenyl ring;

and X represents a hydrogen atom or an atom or group capable of splitting off upon reaction with an oxidation product of a color developing agent.

Again, the Class-IV, Class-V and Class-VI cyan dye forming image couplers, like the magenta dye forming coupler previously described, are art recognized to exhibit different degrees of unwanted yellow density on coupling and to thus be best matched with differing degrees of yellow masking for optimal performance. Mixtures of these couplers may be employed as known in the art to provide additional benefits such as improved dye hue, improved stability, improved physical properties, and improved image to fog discrimination.

While these dye image-forming couplers may have any equivalency known in the art, it is specifically contemplated that they be four equivalent couplers or preferably two equivalent couplers. The terms "equivalent" and "equivalency" indicate the formal stoichiometric relationship between the number of moles of silver reduced per mole of image dye formed in a coupling reaction. Further, any of these couplers may be incorporated as so-called polymeric couplers where the point of attachment of the coupler moiety to a polymeric structure is through a substituent group, all as known in the art.

While any suitable support may be employed for the color originating materials, and specifically the color negative films useful in the practice of the invention, it is specifically contemplated to employ supports bearing magnetic information layers as described at Research Disclosure Item 34390, 1992 and at U.S. Pat. Nos. 5,252,441 and 5,254,449, the disclosures of which are incorporated by reference. Color negative films employing such layers can be employed in combination with cameras that can record and cause to be stored on such a layer various useful information related to the use and history of the color negative film. Specific examples include but are not limited to exposure information on a per scene and per roll basis. These films can then be processed in automated processing apparatus that can retrieve film characteristic information as well as film exposure and use information, and optionally modify the processing to ensure optimal performance and optionally record the details of processing on the magnetic layer. The films can then be printed using automated printers that can retrieve both film and process history information and optionally alter, based on the information retrieved from the magnetic layer, exposure characteristics chosen from printing time, printing light intensity, printing light color balance, printing light color temperature, printing magnification or printing lens adjustment exposure or printing time and the color filters so as to enable production of well balanced display prints from various color originating materials. These layers can be located on the same side of the support as light sensitive layers or arranged so that the support is between the magnetic layer and the light sensitive layers. This information is useful in altering film processing and printing conditions so as to aid in producing a pleasing image. These magnetic layers tend to absorb light in the blue region of the spectrum thereby further compromising the printing speed than can be attained from such a negative and limiting the amount of blue masking that can be employed. This latter problem is solved by practice of the current invention.

Automated color printers may be provided with means to monitor the color density of a color negative material in the blue wavelength range typically centered at about 450 nm and independently in the green range and red range. Means are further provided to alter, based on these density readings, exposure characteristics chosen from printing time, printing light intensity, printing light color balance, printing light color temperature, printing magnification or printing lens adjustment exposure or printing time and the color filters so as to enable production of well balanced display prints from various color originating materials having dyes that differ in hue.

These ranges are appropriate for monitoring the yellow, magenta and cyan dye amounts in the color negative but results in a situation where the color display material, sensitized to about 480 nm or more in the blue sensitive layer, and the color printer monitor read different blue densities from the same scene as recorded in, for example, a color negative. Since the difference in density depends greatly on exactly which image coupler derived dyes are present in the color negative, different correction factors need to be programmed into the automated printer to adequately print a variety of negatives onto a common paper. The resultant need for careful attention and color negative film segregation among automated printers results in a large number of mistakes in the printing process and much rework. It would be much preferred to employ color print materials and automated color printer monitors that were matched in spectral sensitivities. Color display elements according to the present invention provide a solution to this latter problem.

It is additionally contemplated to employ the color negative films useful in the current invention in limited use or single use cameras. Useful characteristics for color negative films and single use cameras are described in copending U.S. patent application Ser. No. 08/135,700 by Sowinski et al entitled "Limited Use Cameras and Films" filed Oct. 13, 1993, the disclosures of which are incorporated by reference.

As can now be readily appreciated, a color display material where the separation of the peak green and red spectral sensitivities was increase to greater than about 155 nm and which incorporated a tabular grain silver chloride emulsion in the slowed layer would also be expected to provide improved images alone or when exposed through a color originating material employing reduces magenta layer masking. Other combinations will be readily apparent to those skilled in the art.

The operation of the invention will now be described in greater detail by the following examples which are meant to illustrate but not in any way limit the scope of the invention.

EMULSION PREPARATIVE EXAMPLE 1

A 4.5 L solution containing 3.5 percent by weight of low methionine gelatin, 0.0056 mol/L of sodium chloride and 0.00034 mol/L of potassium iodide was provided in a stirred reaction vessel. The contents of the reaction vessel were maintained at 40° C., and the pCl was 2.25.

While this solution was vigorously stirred, 90 mL of 2.0M silver nitrate solution and 90 mL of a 1.99M sodium chloride solution were added simultaneously at a rate of 180 mL/min each.

The mixture was then held for 3 minutes, the temperature remaining at 40° C. Following the hold, a 0.5M silver nitrate solution and a 0.5M sodium chloride solution were added simultaneously at 24 mL/min for 40 minutes, the pCl being maintained at 2.25. The 0.5M silver nitrate solution and the 0.5M sodium chloride solution were then added simultaneously with a ramped linearly increasing flow from 24 mL/min to 37.1 mL.min over 70 minutes, the pCl being maintained at 2.25. Finally, 0.75M silver nitrate solution and 0.75M sodium chloride solution were added at a constant rate of 37.1 mL/min over 90 minutes, the pCl being maintained at 2.25. The emulsion was then washed using an ultrafiltration unit, and its final pH and pCl were adjusted to 5.5 and 1.8 respectively.

The resultant emulsion was a tabular grain silver iodochloride emulsion containing 0.06 mol percent iodide, based on silver. More than 50 percent of the total grain projected area was provided by tabular grains having <100> major faces with an average equivalent circular diameter of about 1.5 microns and an average grain thickness of about 0.15 microns.

SPECTRAL SENSITIZATION AND EVALUATION EXAMPLE 2

The spectral sensitization characteristics of sensitizing dyes SBD-1 through SBD-10 when aggregated on a silver chloride tabular grain emulsion were evaluated by spectral sensitizing a <100> faced silver chloride tabular emulsion having an average equivalent circular diameter of about 1.3 microns and an average grain thickness of about 0.15 microns with 0.85 mmole of dye per mole of silver. These emulsions were then applied to a clear support at a laydown of 1.6 g of silver per $m^2$ in gelatin at 3.22 g per $m^2$ with hardening.

The effectiveness of the sensitization was evaluated by exposing the coatings thus prepared to daylight through a graduated density test object, developing the exposed coatings using a hydroquinone developer and then measuring the density formed after development as a function of exposure. The coated emulsion samples treated with spectral sensitizing dyes SBD-1 through SBD-10 all showed photographic sensitivity greater than that exhibited by a coated sample of the same emulsion which was not treated with any spectral sensitizing dye thus confirming that the dyes had served to spectrally sensitize the emulsion.

The spectral characteristics of the dyed emulsions were evaluated by spectrophotometry of the coatings containing the emulsions. All of the coatings showed a peak absorption at between about 440 and 471 nanometers.

PREPARATIVE COLOR PRINT MATERIAL EXAMPLE 3

A color photographic display material (Photographic Sample P01) intended for direct viewing was prepared by applying the following layers in the given sequence to a reflective support. The quantities of other materials are given in g per $m^2$.

Layer 1 {Underlayer} 3.24 g gelatin.

Layer 2 {Blue-Sensitive Layer} Blue sensitized (dye SBD-1) silver chloride cubic emulsion with edge length ca. 0.58 microns exhibiting a peak sensitivity at about 480 nm at 0.28 g, yellow dye-forming image coupler Y at 1.08 g with gelatin at 1.53 g.

Layer 2 {Interlayer} Oxidized developer scavenger S at 0.09 g, with gelatin at 0.76 g.

Layer 3 {Green-Sensitive Layer} Green sensitized silver chloride cubic emulsion with edge length ca. 0.28 microns exhibiting a peak sensitivity at about 550 nanometers at 0.26 g, magenta dye-forming image coupler M at 0.39 g, stabilizer SS at 0.17 g, scavenger S at 0.04 g with gelatin at 1.27 g.

Layer 4 {Interlayer} Oxidized developer scavenger S at 0.02 g, dye UV at 0.28 g, dye UVT at 0.05 g with gelatin at 0.63 g.

Layer 5 {Red-Sensitive Layer} Red sensitized silve chloride cubic emulsion with edge length ca. 0.38 microns exhibiting a peak sensitivity at about 700 nanometers at 0.20 g, cyan dye-forming image coupler C at 0.42 g with gelatin at 1.09 g.

Layer 6 {Interlayer} Oxidized developer scavenger S at 0.02 g, dye UV at 0.28 g, dye UVT at 0.05 g with gelatin at 0.63 g.

Layer 7 {Protective layer} Gelatin at 1.08 g

This film was hardened at coating. Surfactants, coating aids, scavengers, soluble absorber dyes and stabilizers were added to the various layers of this sample as is commonly practiced in the art.

Photographic Sample P02 was prepared like Photographic Sample P01 except the blue sensitized silver chloride emulsion was instead spectrally sensitized to show a peak sensitivity at about 470 nm using dye SBD-5.

Photographic Sample P03 was prepared like Photographic Sample P01 except the blue sensitive silver chloride cubic emulsion in Layer 1 was replaced with a similarly spectrally sensitized (about 480 nm) blue sensitive silver chloride cubic emulsion having an edge length of ca. 0.75 microns.

Photographic Sample P04 was prepared like Photographic Sample P03 except the blue sensitized silver chloride cubic emulsion in Layer 1 was instead spectrally sensitized to show a peak sensitivity at about 470 nm using SBD-5.

Photographic Sample P05 was prepared like Photographic Sample P01 except the blue sensitive silver chloride cubi emulsion in Layer 1 was replaced with a similarly spectrally sensitized (about 480 nm) <100>-faced blue sensitive silver chloride tabular shaped emulsion having an average equivalent circular diameter of ca. 1.5 microns and an average grain thickness of ca. 0.15 microns.

Photographic Sample P06 was prepared like Photographic Sample P05 except the blue sensitized silver chloride <100> faced tabular emulsion in Layer 1 was instead spectrally sensitized to show a peak sensitivity at ca. 470 nm.

Other color photographic print materials intended for use as intermediate films or as projection films can be prepared in a similar manner using a transparent support.

(SP = $-CH_2CH_2CH_2SO_3^-$) SBD-1

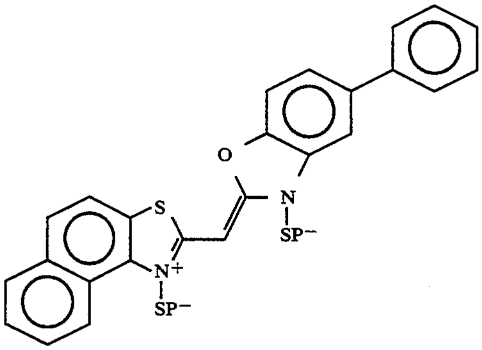

SBD-2

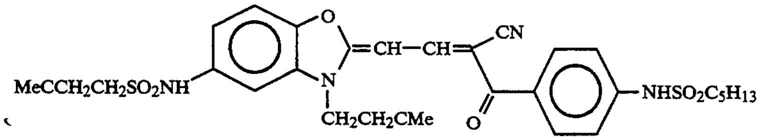

(SP = $-CH_2CH_2CH_2SO_3^-$) SBD-3

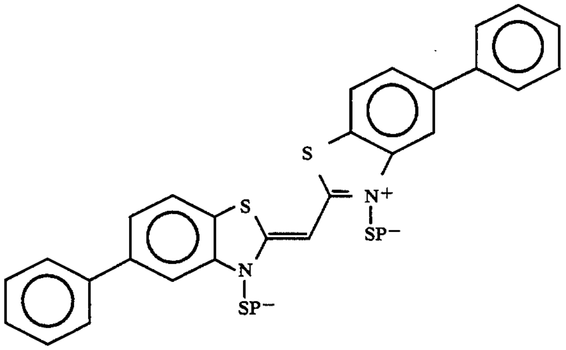

(SP = $-CH_2CH_2CH_2SO_3^-$) SBD-4

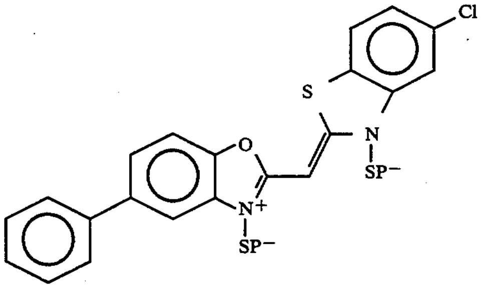

(SP = $-CH_2CH_2CH_2SO_3^-$) SBD-5

-continued
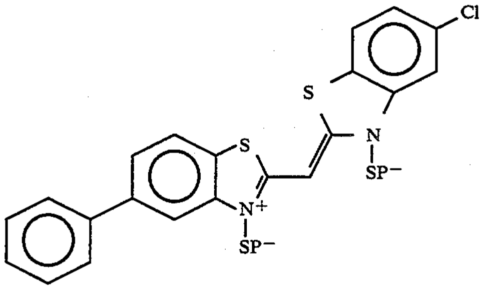
(SP = $-CH_2CH_2CH_2SO_3^-$)
SBD-6
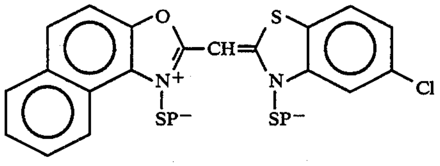
(SP = $-CH_2CH_2CH_2SO_3^-$)
SBD-7
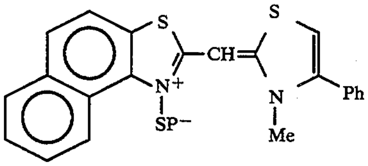
(SB = $-CH_2CH_2CH_2CH_2SO_3^-$)
SBD-8
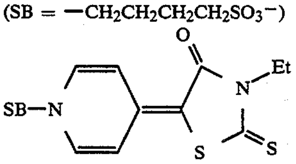
(SP = $-CH_2CH_2CH_2SO_3^-$)
SBD-9
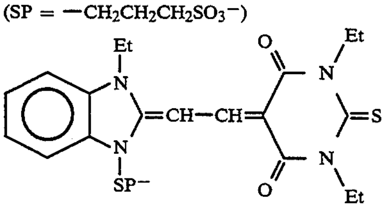
(SP = $-CH_2CH_2CH_2SO_3^-$)
SBD-10
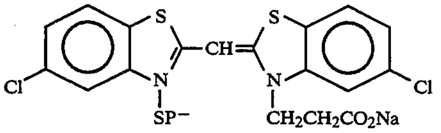
Y
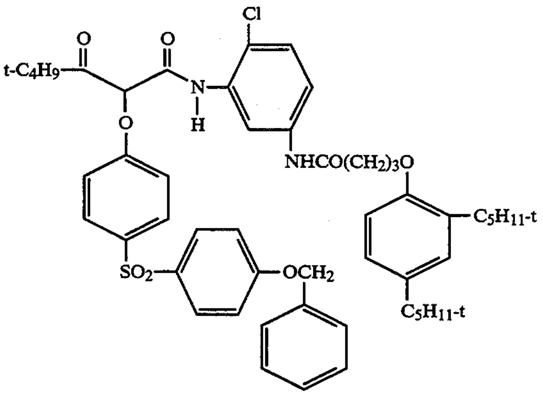

-continued

S

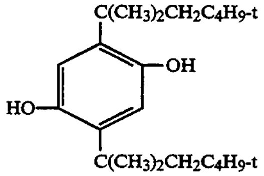

M

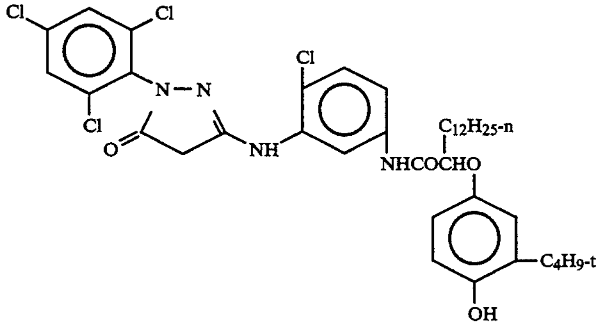

UV

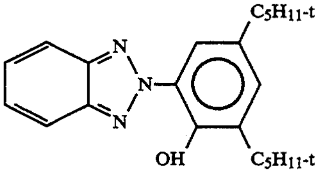

C

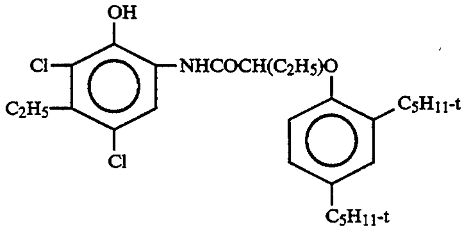

SS

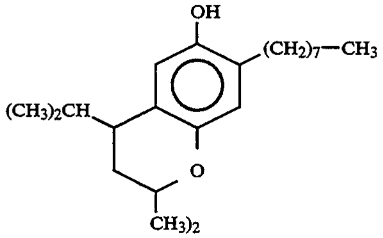

UVT

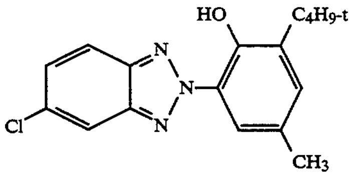

BD-1

(SP = $-CH_2CH_2CH_2SO_3^-$)

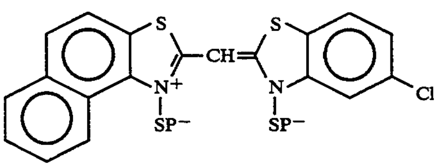

ILLUSTRATIVE PHOTOGRAPHIC DEVELOPMENT PROCESS EXAMPLE 4

Photographic Samples P01 through P06 were exposed to white light through a graduated density test object and developed generally according to the process described at U.S. Pat. Nos. 4,892,804 and 4,975,357. Both 45 second and 30 second developer contact time processes were run. The relative photographic sensitivity of the samples and the relative developability, indicated by the shoulder density of the blue layer of these samples in the rapid access process were monitored. These results are shown in Table I below.

TABLE I

Photographic Sensitivity and Density Formation in the Blue Sensitive Layer of Color Print Materials PO1 through PO6

| Sample | Emulsion | Sensitization Peak | Relative Blue Layer Sensitivity | Relative Blue Layer Shoulder Density |
|---|---|---|---|---|
| PO1 (C) | ca. 0.58 cube | ca. 480 nm | 100% | 100% |
| PO2 (C) | ca. 0.58 cube | ca. 470 nm | 78% | 100% |
| PO3 (C) | ca. 0.75 cube | ca. 480 nm | 158% | 80% |
| PO4 (C) | ca. 0.75 cube | ca. 470 nm | 83% | 80% |
| PO5 (C) | Tabular | ca. 480 nm | 204% | 105% |
| PO6 (I) | Tabular | ca. 470 nm | 138% | 105% |

As can be readily appreciated on examination of the photographic data presented in Table I, the use of a tabular AgCl blue-sensitive layer in a color print material allows for the spectral sensitization to be shifted to shorter than 480 nm while enabling an absolute increase in sensitivity. The short blue light-sensitive tabular AgCl layer in sample P06 greatly exceeds the speed of any of the short blue light-sensitive cubic AgCl layer while maintaining excellent density formation, particularly over larger grain cubic emulsions. Thus, the tabular AgCl gives the sensitivity required to practice the invention and overcomes developability deficiencies of conventional cubic emulsions. As shown by comparison of P06 with P01–P04, the invention allows both high sensitivity and high shoulder density, whereas the comparisons do not achieve both high sensitivity and high shoulder density.

Similar results were obtained employing a photographic paper sample that differed from sample P06 only in that dye SBD-3 was employed in place of SBD-5.

PREPARATIVE COLOR NEGATIVE MATERIAL EXAMPLE 5

A light sensitive color photographic material (Photographic Sample N01) for color negative development was prepared by applying the following layers in the given sequence to a transparent support of cellulose triacetate. The quantities of silver halide are given in g of silver per $m^2$. The quantities of other materials are given in g per $m^2$.

Layer 1 {Antihalation Layer} black colloidal silver sol containing 0.236 g of silver, with 2.44 g gelatin.

Layer 2 {First (least) Red-Sensitive Layer} Red sensitized silver iodobromide emulsion [1.3 mol % iodide, average grain diameter 0.55 microns, average thickness 0.08 microns] at 0.37 g, red sensitized silver iodobromide emulsion [4 mol % iodide, average grain diameter 1.0 microns, average thickness 0.09 microns] at 0.47 g, cyan dye-forming image coupler C-1 at 0.56 g, cyan dye-forming soluble magenta dye releasing masking coupler CM-1 at 0.028 g, compound B-1 at 0.039 g, with gelatin at 1.83 g.

Layer 3 {Second (more) Red-Sensitive Layer} Red sensitive silver iodobromide emulsion [4 mol % iodide, average grain diameter 1.3 microns, average grain thickness 0.12 microns] at 0.72 g, cyan dye-forming image coupler C-1 at 0.23 g, cyan dye-forming soluble magenta dye-releasing masking coupler CM-1 at 0.011 g, DIR compound D-1 at 0.011 g, with gelatin at 1.66 g.

Layer 4 {Third (most) Red-Sensitive Layer} Red sensitized silver iodobromide emulsion [4 mol % iodide, average grain diameter 2.6 microns, average grain thickness 0.13 microns] at 1.11 g, cyan dye-forming image coupler C-1 at 0.15 g, cyan dye-forming soluble magenta dye-releasing masking coupler CM-1 at 0.039 g, DIR compound D-1 at 0.013 g, DIR compound D-2 at 0.050 g, with gelatin at 1.36 g.

Layer 5 {Interlayer} 1.33 g of gelatin.

Layer 6 {First (least) Green-Sensitive Layer} Green sensitized silver iodobromide emulsion [1.3 mol % iodide, average grain diameter 0.55 microns, average grain thickness 0.08 microns] at 0.33 g, green sensitized silver iodobromide emulsion [4 mol % iodide, average grain diameter 1.0 microns, average grain thickness 0.09 microns] at 0.33 g, magenta dye-forming image coupler M-1 at 0.24 g, magenta dye-forming soluble yellow dye-releasing masking coupler MM-1 at 0.056 g with gelatin at 1.78 g.

Layer 7 {Second (more) Green-Sensitive Layer} Green sensitized silver iodobromide emulsion [4 mol % iodide, average grain diameter 1.25 microns, average grain thickness 0.12 microns] at 1.00 g, magenta dye-forming image coupler M-1 at 0.08 g, magenta dye-forming soluble yellow dye-releasing masking coupler MM-1 at 0.089 g, DIR compound D-1 at 0.024 g with gelatin at 1.48 g.

Layer 8 {Third (most) Green-Sensitive Layer} Green sensitized silver iodobromide emulsion [4 mol % iodide, average grain diameter 2.16 microns, average grain thickness 0.12 microns] at 1.00 g, magenta dye-forming image coupler M-1 at 0.083 g, magenta dye-forming soluble yellow dye-releasing masking coupler MM-1 at 0.039 g, DIR compound D-3 at 0.011 g, DIR compound D-4 at 0.011 g, with gelatin at 1.33 g.

Layer 9 {Interlayer} Yellow dye material YFD at 0.11 g with 1.33 g gelatin.

Layer 10 {First (less) Blue-Sensitive Layer} Blue sensitized silver iodobromide emulsion [1.3 mol % iodide, average grain diameter 0.55 microns, average grain thickness 0.08 microns] at 0.11 g, blue sensitized silver iodobromide emulsion [4 mol % iodide, average grain diameter 1.25, average grain thickness 0.12 microns] at 0.26 g, blue sensitized silver iodobromide emulsion [6 mol % iodide, average grain diameter 1.0 microns, average grain thickness 0.26 microns] at 0.26 g, yellow dye forming image coupler Y-1 at 0.94 g, DIR compound D-5 at 0.049 g, compound B-1 at 0.003 g with gelatin at 2.6 g.

Layer 11 {Second (more) Blue-Sensitive Layer} Blue sensitized silver iodobromide emulsion [4 mol % iodide, average grain diameter 3.0 microns, average grain thickness 0.14 microns] at 0.39 g, blue sensitized silver iodobromide emulsion [9 mol % iodide, average grain diameter 1.0] at 0.39 g, yellow dye-forming image coupler Y-1 at 0.28 g, DIR compound D-5 at 0.044 g, compound B-1 at 0.006 g with gelatin at 1.97 g.

Layer 12 {UV Layer} 0.111 g of dye UV-1, 0.111 g of dye UV-2, unsensitized silver bromide Lippman emulsion at 0.222 g, with gelatin at 0.72 g.

Layer 13 {Protective Layer} 0.054 g anti-matte polymethylmethacrylate beads with gelatin at 0.92 g.

This film was hardened at coating. Surfactants, monomeric or polymeric coating aids, scavengers, soluble absorber dyes, spatially fixed dyes and stabilizers were added to the various layers of this sample as is commonly practiced in the art. The imaging layers had a total thickness of about 20 microns while the entire material had a thickness of about 24 microns above the support.

Photographic Sample N02 was prepared like Photographic Sample N01 except the magenta dye-forming soluble yellow dye releasing masking coupler MM-1 was omitted from the green-sensitive layers.

Photographic Sample N03 was prepared like Photographic Sample N01 except the magenta dye-forming image coupler M-1 in the green-sensitive layers was placed with magenta dye-forming image couplers M-2 and M-3. The levels in layer 6 were 0.073 g of magenta dye-forming image coupler M-2 and 0.24 g of magenta dye-forming image coupler M-3. The levels in layer 7 were 0.03 g of magenta dye-forming image coupler M-2 and 0.098 g of magenta dye-forming image coupler M-3. The levels in layer 8 were 0.03 g of magenta dye-forming image coupler M-2 and 0.098 g of magenta dye-forming image coupler M-3.

Photographic Sample N04 was prepared like Photographic Sample N03 except the magenta dye-forming soluble yellow dye releasing masking coupler MM-1 was omitted from the green-sensitive layers.

Photographic Sample N05 was prepared like Photographic Sample N01 except the magenta dye-forming image coupler M-1 in the green-sensitive layers was replaced with magenta dye-forming image coupler M-4. The levels of magenta dye-forming image coupler M-4 in the green-sensitive layers were as follows; layer 6 contained 0.70 g, layer 7 contained 0.38 g, and layer 8 contained 0.31 g.

Photographic Sample N06 was prepared like Photographic Sample N05 except the magenta dye-forming soluble yellow dye releasing masking coupler MM-1 was omitted from the green-sensitive layers.

Photographic Sample N07 was similar to Photographic Sample N01 except that cyan dye-forming soluble yellow dye-releasing masking coupler CM-2 was added to the red sensitive layers at 0.065 g.

Photographic Sample N08 was similar Photographic Sample N01 except that cyan dye-forming image coupler C-1 was replaced in the red sensitive layers by an equimolar quantity of cyan dye-forming image coupler C-2.

Photographic Sample N09 was similar Photographic Sample N08 except that cyan dye-forming soluble yellow dye-releasing masking coupler CM-2 was added to the red sensitive layers at 0.065 g.

Photographic Sample N10 was similar Photographic Sample N01 except that cyan dye-forming image coupler C-1 was replaced in the red sensitive layers by an equimolar quantity of cyan dye-forming image coupler C-3.

Photographic Sample N11 was similar Photographic Sample N10 except that cyan dye-forming soluble yellow dye-releasing masking coupler CM-2 was added to the red sensitive layers at 0.065 g.

Photographic Sample N12 was similar Photographic Sample N01 except that a support bearing a magnetic layer showing added blue density of ca. 0.05; added green density of 0.03 and added red density of 0.02 was employed.

Photographic Samples N07 through N12 employed silver halide emulsions which were reduced in equivalent circular diameter by an amount sufficient to half the sensitivity of samples N07 through N12 relative to N01 through N06. Further, spatially fixed blue Dmin adjusting dyes were omitted from sample N07 through N12.

Photographic Sample N13 was prepared generally as described above by providing on a clear support:

A red light sensitive color record comprising: red sensitized silver iodobromide emulsion [ca. 4 mol % iodide, 1.0 micron equivalent circular diameter, 0.09 microns thick] at 0.54 g, red sensitized silver iodobromide emulsion [ca. 4 mol % iodide, 1.3 micron equivalent circular diameter, 0.12 microns thick] at 0.53 g, cyan dye-forming image coupler C-1 at 0.65 g, DIR compound D-1 at 0.032 g, DIR compound D-2 at 0.022 g, masking coupler CM-2 at 0.032 g, masking coupler CM-1 at 0.054 g with 1.95 g gelatin.

A green light sensitive color record comprising: green sensitized silver iodobromide emulsion [ca. 4 mol % iodide, 1.0 micron equivalent circular diameter, 0.09 microns thick] at 0.54 g, green sensitized silver iodobromide emulsion [ca. 4 mol % iodide, 1.3 micron equivalent circular diameter, 0.12 microns thick] at 0.53 g, magenta dye-forming image coupler M-2 at 0.22 g, magenta dye forming image coupler M-3 at 0.22 g, DIR compound D-4 at 0.043 g, DIR compound D-3 at 0.022 g, masking coupler MM-1 at 0.065 g, with 1.63 g gelatin.

A blue light sensitive color record comprising: blue sensitized silver iodobromide emulsion [ca. 4 mol % iodide, 0.9 micron equivalent circular diameter, 0.09 microns thick] at 0.38 g, blue sensitized silver iodobromide emulsion [ca. 4 mol % iodide, 3.4 micron equivalent circular diameter, 0.14 microns thick] at 0.39 g, yellow dye-forming image coupler Y-1 at 1.08 g, DIR compound D-5 at 0.108 g, BAR compound B-1 at 0.005 g, DYE-3 at 0.011 g, with 1.94 g gelatin.

Along with antihalation layers, interlayers, yellow filter layers and overcoat layers as known in the art. These layers comprised 5.16 g gelatin, DYE-1 at 0.011 g, DYE-2 at 0.004 g, DYE-3 at 0.011 g, UV-1 at 0.108 g, UV at 0.054 g, UV-2 at 0.108 g, YFD at 0.108 g, SOL-1 at 0.01 g, SOL-2 at 0.005 g, silver bromide lippman emulsion at 0.11 g, scavengers S-1 and S, anti-matte beads, surfactants, sequestering agents, antifoggants, lubricants, coating aids, and so forth as known in the art. The sample was hardened with bisvinylsulfonyl methane at coating. The imaging layers had a total thickness of about 11 microns while the entire material had a thickness of about 14 microns above the support.

Photographic Sample N14 was like sample N13 except that a clear support bearing magnetic recording media of constant optical density according to Research Disclosure Item 34390 of November 1992 was employed. The magnetic media provided a constant additional support STATUS M density of 0.08 red, 0.05 green and 0.05 blue.

Photographic Sample N15 was like sample N-14 except that the red, green and blue sensitized silver iodobromide emulsions were omitted and equal quantities of red, green and blue sensitized <100>-faced silver chloride tabular emulsions having equivalent circular diameters and thicknesses of ca. 1.2 by 0.14 microns and of ca. 1.5 microns by 0.12 microns were coated in their place.

Photographic Sample N16 was like sample N15 except that the clear support was again employed.

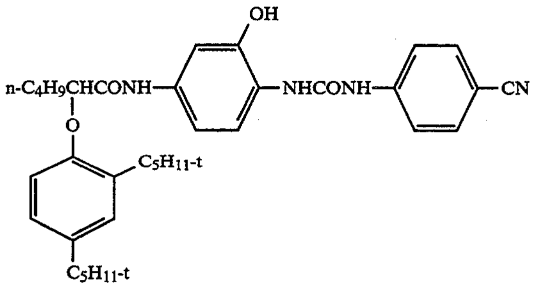
C-1
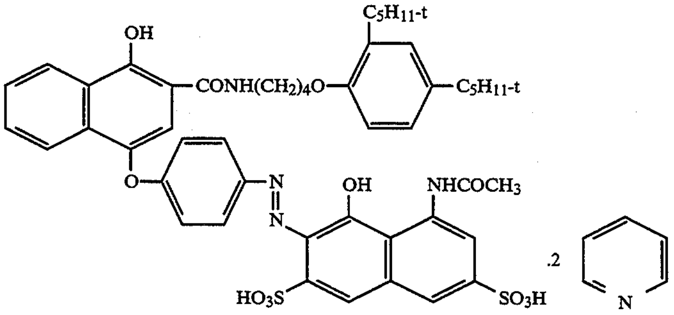
CM-1
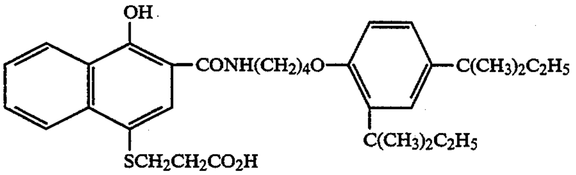
B-1
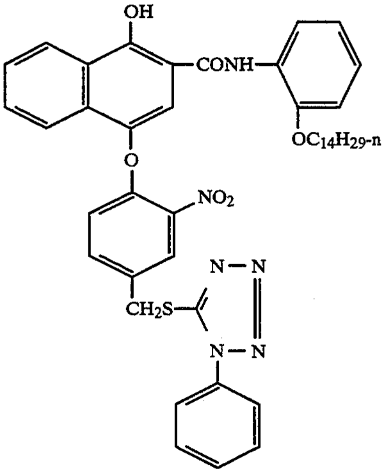
D-1
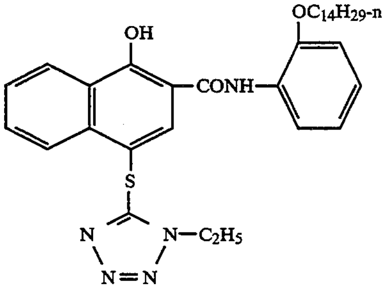
D-2
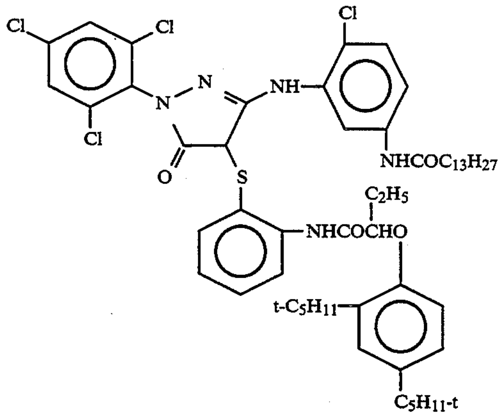
M-1

-continued
MM-1
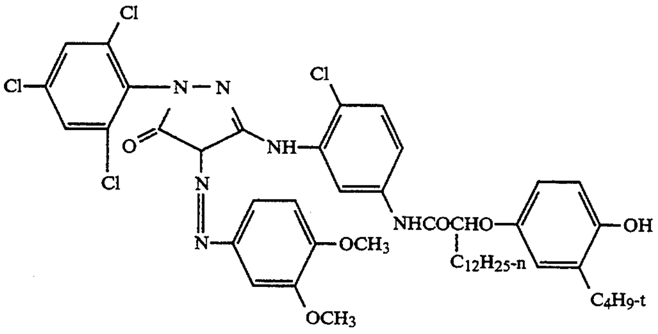
D-3
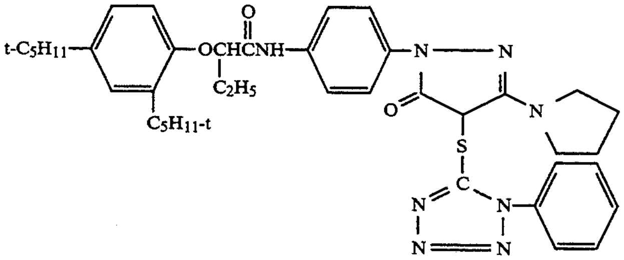
D-4
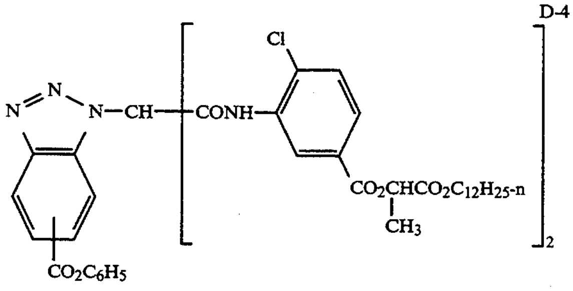
YFD
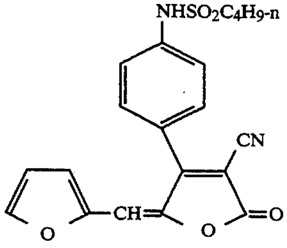
Y-1
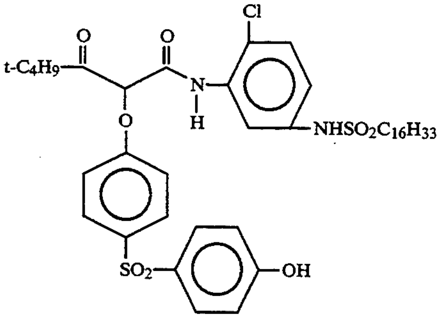
D-5
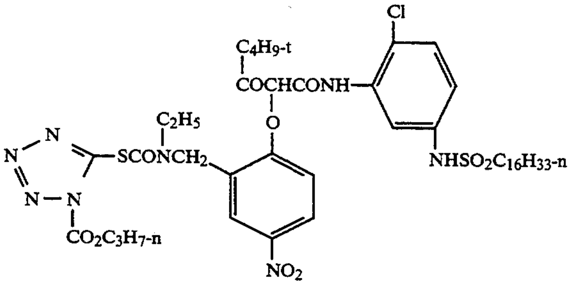

-continued
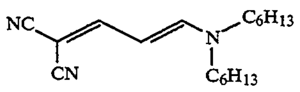
UV-1
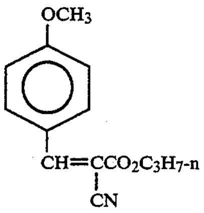
UV-2
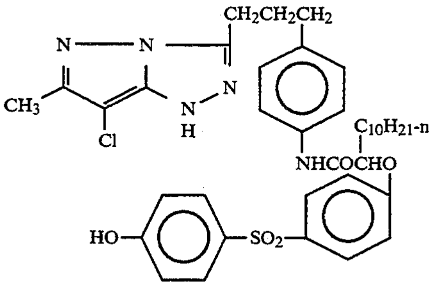
M-2
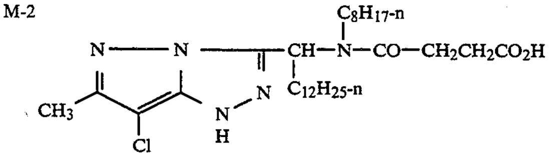
M-3
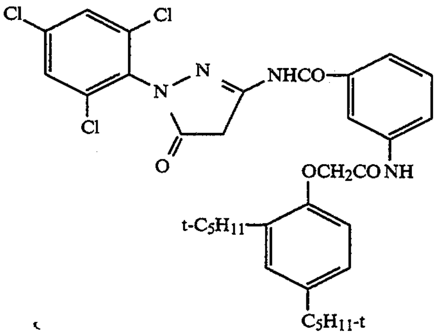
M-4
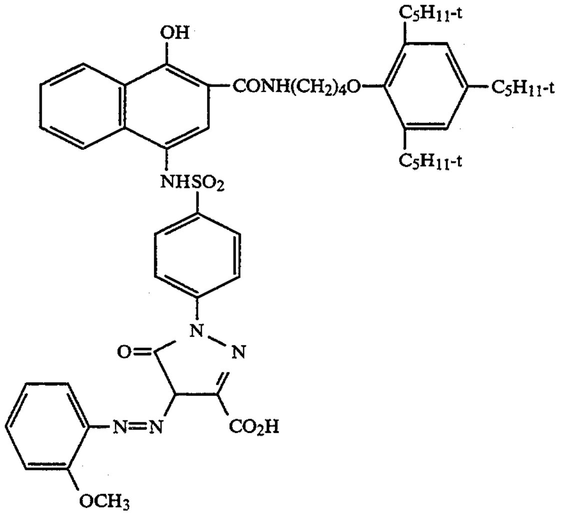
CM-2
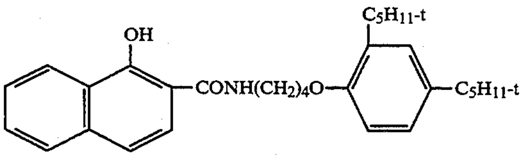
C-2
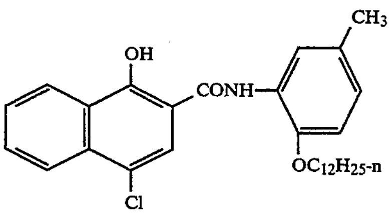
C-3

-continued

DYE-1

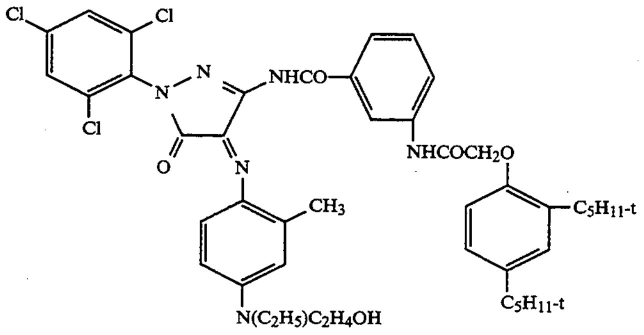

DYE-2

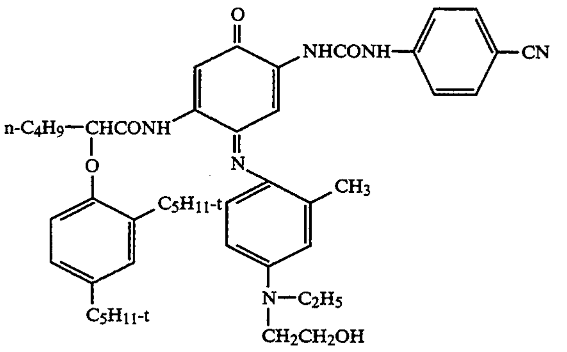

DYE-3

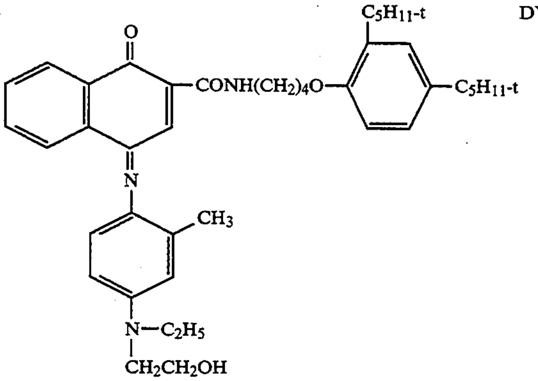

S-1

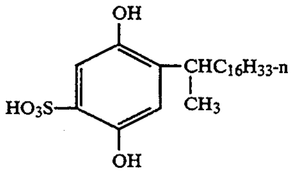

SOL-1

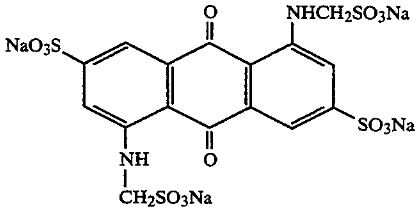

SOL-2

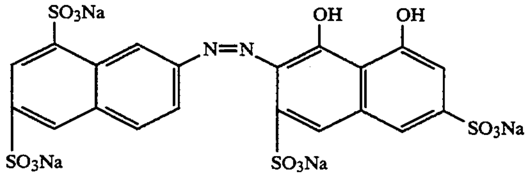

ILLUSTRATIVE PHOTOGRAPHIC PRINTING EXAMPLE 6

Light sensitive color photographic originating materials N01 through N16 were exposed to white light through a graduated density test object and processed according to KODAK Color Negative process C-41 as described at The British Journal of Photography Annual of 1988, pages 196–198, with the bleach bath modified to comprise iron 1,3-propylene diamine tetraacetic acid. The color images formed in these color originating materials were then optically printed onto the light sensitive color photographic display material samples P01, P02 or P06 using a color printer balanced for a neutral balance step of the originating film N01. The exposed color display materials were then processed using the process described earlier at Example 4 and and the relative printing time required to achieve equivalent printing for the blue sensitive record was determined. Since the permanent blue Dmin of samples N07 through N12 which would normally be present to promote acceptable printing in an automated printer was omitted from these samples, the relative printing times were adjusted to reflect this bias. The results of this analysis are shown in Table II below.

TABLE II

Impact of Originating and Display Material Composition on Relative Blue Printing Time of Display Material

| Color Originating Material | | | | Relative Blue Printing Times of Color Display Materials as Influenced by Color Originating Material Composition | | |
|---|---|---|---|---|---|---|
| | Magenta Coupler Class | Cyan Coupler Class | | P01 | P02 | P06 (inventive) |
| 1 | 2 | 3 | 4 | 5 | 6 | 7 |
| N01 | III-y | IV-n | N | 0.68 | 0.81 | 0.42 |
| N02 | III-n | IV-n | N | 0.43 | 0.51 | 0.27 |
| N03 | II-y | IV-n | N | 0.78 | 0.98 | 0.51 |
| N04 | II-n | IV-n | N | 0.55 | 0.65 | 0.33 |
| N05 | I-y | IV-n | N | 1.00 | 1.38 | 0.72 |
| N06 | I-n | IV-n | N | 0.55 | 0.71 | 0.36 |
| N07 | III-y | IV-n | N | 0.79 | 0.95 | 0.49 |
| N08 | III-y | V-n | N | 0.72 | 0.85 | 0.45 |
| N09 | III-y | V-n | N | 0.81 | 0.95 | 0.50 |
| N10 | III-y | VI-n | N | 0.69 | 0.83 | 0.44 |

TABLE II-continued

Impact of Originating and Display Material Composition on Relative Blue Printing Time of Display Material

| Color Originating Material | | | | Relative Blue Printing Times of Color Display Materials as Influenced by Color Originating Material Composition | | |
|---|---|---|---|---|---|---|
| | Magenta Coupler Class | Cyan Coupler Class | | P01 | P02 | P06 (inventive) |
| 1 | 2 | 3 | 4 | 5 | 6 | 7 |
| N11 | III-y | VI-n | N | 0.85 | 1.02 | 0.54 |
| N12 | III-y | IV-n | Y | 0.72 | 0.85 | 0.45 |
| N13 | II-y | IV-y | N | 0.91 | 1.17 | 0.60 |
| N14 | II-y | IV-y | Y | 0.98 | 1.35 | 0.69 |
| N15 | II-y | IV-y | Y | 1.02 | 1.55 | 0.81 |
| N16 | II-y | IV-y | N | 0.81 | 1.23 | 0.65 |

Footnotes to Table II:
column 1 lists Color Originating Material sample number.
column 2 lists magenta image coupler class, presence or absence of G → B masking coupler indicated by y (= yes) or n (= no).
column 3 lists cyan image coupler class, presence or absence of R → B masking coupler indicated by y (= yes) or n (= n).
column 4 lists presence of constant density layer.
column 5 lists relative blue printing time of color display material P01 which contains a cubic AgCl emulsion sensitized to about 480 nm (always comparative).
column 6 lists relative blue printing time of color display material P02 which contains a cubic AgCl emulsion sensitized to about 470 nm (always comparative).
column 7 lists relative blue printing time of inventive color display material P06 which contains a tubular AgCl emulsion sensitized to about 470 nm.

As can be readily appreciated, the combination of optically printing a color originating material on a color display material comprising a tabular shaped blue light sensitized emulsion P06 sensitized to about 470 nanometers enables large reductions in printing time for all of the combinations of color originating material technology exemplified in by samples N01 through N16. This improved printing speed is not attainable with the symmetric emulsion employed in color print sample P01 or P02.

ILLUSTRATIVE COLOR ANALYSIS EXAMPLE 7

The relative color reproduction characteristics of color negative film sample N01 comprising a magenta dye-forming soluble yellow dye releasing masking coupler when optically printed onto a color paper with a peak blue layer sensitivity at 480 nm as compared to the same negative printed onto a color paper with a peak blue sensitivity at 470 nm was determined for 216 color patches. The results of six representative color patches, of the 216, are shown in the CIELAB plot shown as FIG. 1. The CIELAB color space and methodology of measurement is described at "ASTM Standards on Color and Appearance Measurements", 2nd ed., ASTM, Philadelphia, 1987, at Standard E 308-85, pages 166-ff. The interpretation of such a plot is described by Billmeyer and Saltzman in "Principles of Color Technology", 2nd ed. Wiley, New York, 1981, at pages 58-ff. The tail of the arrow in FIG. 1 indicates the color position after printing onto the 480 nm display material, the length of the arrow indicates the relative magnitude of color change and the head of the arrow indicates the color position after printing onto the 470 nm display material. The actual (aim) color position for each color patch is indicated by a cross symbol. As is readily apparent, the photographic color display material with the shorter blue spectral sensitization enables improved hue and chromaticity in the final viewable image with respect to the actual color position for these representative color samples, as the head of the arrow is closer to the actual color proton. In a similar vein, the relative color reproduction characteristics of color negative sample N01 when printed onto a color paper with peak blue sensitivity at 480 nm or 460 nm was determined for the same 216 color patches and an even greater improvement in color rendition was obtained. FIG. 2 shows the colorimetric characteristics of six representative color patches of the color negative sample N01. As is readily apparent, the photographic color display material with the shorter blue spectral sensitization enables improved hue and chromaticity in the final viewable image with respect to the actual color position for these representative color samples, as the head of the arrow is closer to the actual color proton. In yet another run, the relative color reproduction characteristics of sample N02 which does not include a yellow dye masking coupler was determined after printing onto the 480 or 470 nm paper. In this case, total ommision of the color masking coupler was determined to lead to a net deterioration of color rendition even with the 470 nm paper.

Figure 2:
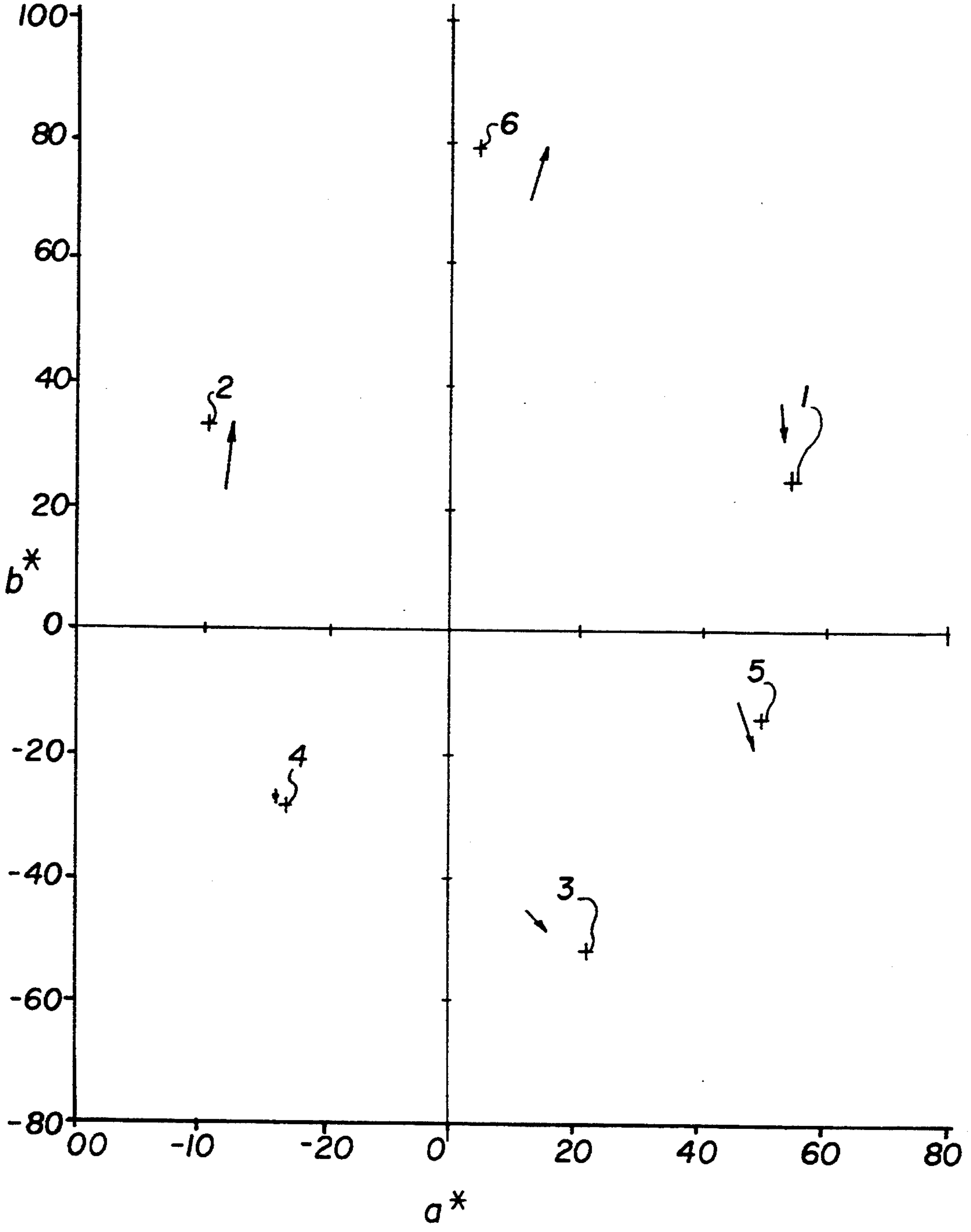
FIG. 2 shows CIELAB mapping of color negative film example N01 when printed onto a color paper.

FIG. 1: CIELAB mapping of color negative film N01 when printed onto a color paper with peak blue sensitivity at 480 nm (tail of arrow) or 470 nm (head of arrow), with respect to actual color position (cross symbol). The numbers refer to reproduction characteristics of individual color patches while the length of the arrows are descriptive of the magnitude of the change in color reproduction.

FIG. 2: CIELAB mapping of color negative film N01 when printed onto a color paper with peak blue sensitivity at 480 nm (tail of arrow) or 460 nm (head of arrow), with respect to actual color position (cross symbol). The numbers refer to reproduction characteristics of individual color patches while the length of the arrows are descriptive of the magnitude of the change in color reproduction.

ILLUSTRATIVE PHOTOGRAPHIC EXAMPLE 8

Light sensitive color photographic originating materials N01 through N12 were exposed to white light through a graduated density test object and processed according to KODAK Color Negative process C-41 as described at The British Journal of Photography Annual of 1988, pages 196–198, with the bleach bath modified to comprise iron 1,3-propylene diamine tetraacetic acid. The Status M blue Dmin and the Status M blue gamma-normalized granularity at 0.15 density units above the blue Dmin were determined following the procedure described at U.S. Pat. No. 5,135,839 at column 125, line 23, to column 126, line 17, and the percent reduction in blue light transmission attributable to yellow dye masking couplers at Dmin were determined for each of these samples. The relative color reproduction characteristics for each color negative sample when printed onto a color paper with peak blue sensitivity at about 470 nm were also determined as illustrated in Example 7. These results are listed in Table III below.

TABLE III

Impact of Originating Material Composition on Overall Color Rendition and the Blue Granularity (GNG) of Originating Material

| Color Originating Material | | | | | Blue | Percent Reduction in Blue Light |
|---|---|---|---|---|---|---|
| | Magenta Coupler Class | Cyan Coupler Class | Relative Color Repro-duction | Blue Layer Dmin | Layer Gamma-Normalized Granularity | Transmission Due to Yellow Mask |
| 1 | 2 | 3 | 4 | 5 | 6 | 7 |
| N01 | III-y | IV-n | + | 0.65 | 0.052 | 52% |
| N02 | III-n | IV-n | 0 | 0.33 | 0.044 | — |
| N03 | II-y | IV-n | + | 0.70 | 0.053 | 59% |
| N04 | II-n | IV-n | 0 | 0.31 | 0.042 | — |
| N05 | I-y | IV-n | + | 0.81 | 0.046 | 63% |
| N06 | I-n | IV-n | 0 | 0.38 | 0.042 | — |
| N07 | III-y | IV-n | ++ | 0.46 | 0.039 | 63% |
| N08 | III-y | V-n | + | 0.33 | 0.037 | 50% |
| N09 | III-y | V-n | ++ | 0.47 | 0.042 | 60% |
| N10 | III-y | VI-n | + | 0.37 | 0.038 | 50% |
| N11 | III-y | VI-n | ++ | 0.51 | 0.040 | 65% |
| N12 | III-y | IV-n | + | 0.35 | 0.036 | 50% |

Footnotes to Table III:

column 1 lists Color Originating Material sample #.

column 2 lists magenta image coupler class, presence or absence of G → B masking coupler indicated by y (= yes) or n (= no).

column 3 lists cyan image coupler class, presence or absence of R → B masking coupler indicated by y (= yes) or n (= n).

column 4 lists relative color reproduction properties available from Color Originating Materials (0 = adequate; + = good; ++ = better) when printed onto a color paper with peak blue layer sensitivity at about 470 nm.

column 5 lists the Status M Dmin of the color negative films.

column 6 lists the blue layer gamma-normalized granularity of the color negative films at a density 0.15 above Dmin.

column 7 lists the percent reduction in blue light transmission at Dmin caused by the presence of yellow dye masking couplers in the color negative samples.

As can be readily appreciated, the combination of optically printing a color originating material on a color display material comprising a tabular shaped blue light sensitized emulsion sensitized at about 470 nm (as in sample P06) enables large reductions in printing speed (shown in Table I) and adequate color reproduction for all of the combinations of color originating material technology exemplified by samples N01 through N16. These comparisons further illustrate the improvement of granularity in the image that can be attained on reduction in the amount of masking coupler. Lower amounts of masking coupler in the negative film would tend to be preferred for use with color print material P06. The exact quantities in each case would be dictated by the color reproduction properties desired for the specific application. Based on these disclosures, it is well within the capabilities of one of average skill in the art to select appropriate color negative image couplers, color negative masking couplers and color paper blue layer spectral sensitivity so as to enable desired visual properties in a color print material.

The invention has been described in detail with particular reference to preferred embodiments thereof, but it will be understood that variations and modifications can be effected within the spirit and scope of the invention.

We claim:

1. A color photographic display element comprising a support bearing a blue light sensitive silver halide emulsion layer, a green light sensitive silver halide emulsion layer, and a red light sensitive silver halide emulsion layer;

wherein said blue light sensitive layer comprises a tabular silver halide grain emulsion having an average equivalent circular diameter of about 0.3 to 2.5 microns and wherein said tabular silver halide is characterized by at least 50 percent of the grain population projected area being accounted for by tabular grains 1) bounded by (100) major faces having adjacent edge ratios of less than 10 and 2) each having an aspect ratio of at least 2, said halide comprising greater than about 95 mol percent chloride, said tabular silver halide being spectrally sensitized with a blue sensitizing dye providing a peak blue sensitivity at between about 440 and 475 nanometers; and wherein said peak blue sensitivity is separated from the peak green layer sensitivity by greater than about 75 nanometers.

2. The element of claim 1 wherein said blue sensitizing dye comprises at least one dye selected from the group consisting of (SP = $-CH_2CH_2CH_2SO_3^-$)

SBD-1

-continued
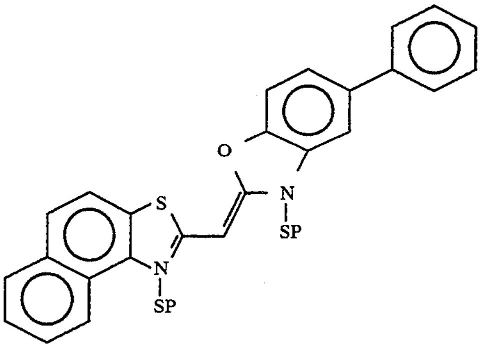
SBD-2
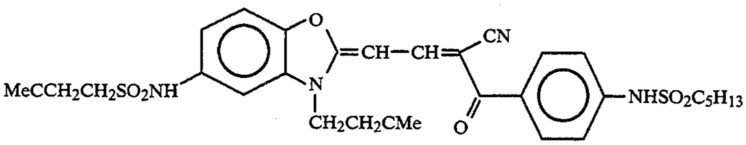
(SP = $-CH_2CH_2CH_2SO_3^-$)
SBD-3
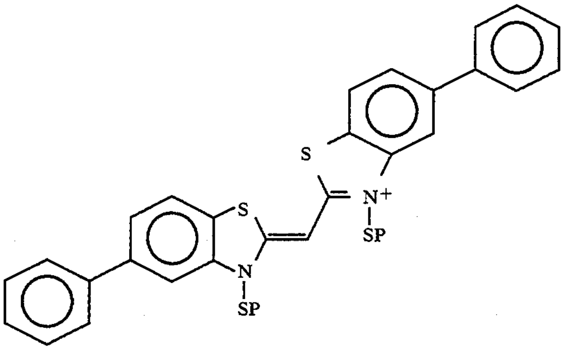
(SP = $-CH_2CH_2CH_2SO_3^-$)
SBD-4
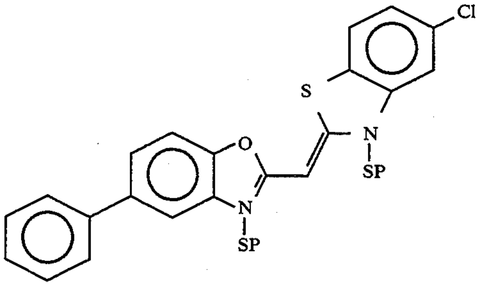
(SP = $-CH_2CH_2CH_2SO_3^-$)
SBD-5
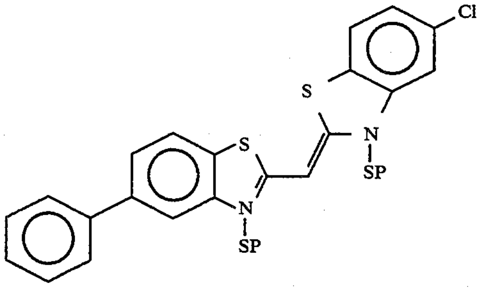
(SP = $-CH_2CH_2CH_2SO_3^-$)
SBD-6

-continued

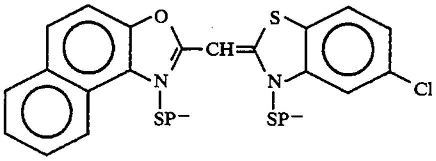

(SP = $-CH_2CH_2CH_2SO_3^-$)

SBD-7

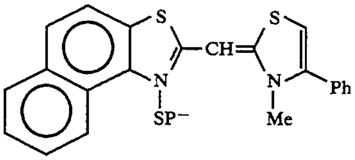

(SB = $-CH_2CH_2CH_2CH_2SO_3^-$)

SBD-8

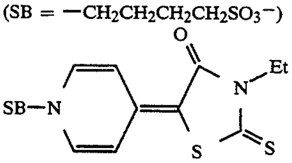

(SP = $-CH_2CH_2CH_2SO_3^-$)

SBD-9

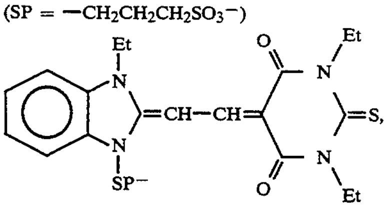

and (SP = $-CH_2CH_2CH_2SO_3^-$)

SBD-10.

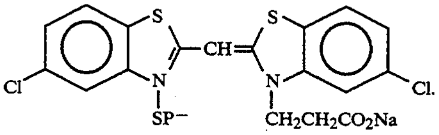

3. The element of claim 1 wherein said support is a reflective support.

4. The element of claim 1 wherein said support is a transparent support.

5. The element of claim 1 wherein said tabular silver halide grains have an average thickness of less than about 0.3 microns.

6. The element of claim 1 wherein said blue light sensitive tabular silver halide grain has in reactive association a yellow dye-forming image coupler;

wherein said green sensitive layer comprises a green light sensitive silver halide emulsion having in reactive association a magenta dye-forming image coupler and wherein said red sensitive layer comprises a red light sensitive silver halide emulsion having in reactive association a cyan dye-forming image coupler.

7. The element of claim 1 wherein at least one of said green or red light sensitive layers comprises a tabular silver halide grain having an average aspect ratio greater than about 2.

8. The element of claim 1 wherein said element comprises a soluble light absorbing dye that is removed during photographic processing.

9. The element of claim 1 wherein said green sensitive layer comprises a substituted pyrazolotriazole or a substituted 3-aminopyrazolone magenta dye forming image coupler.

10. The element of claim 1 wherein said blue light sensitive layer is positioned closer to said support than a green light sensitive layer or a red light sensitive layer.

11. A display element according to claim 1 wherein said display element is selected from the group consisting of color photographic paper, a color photographic advertising transparency, color photographic motion picture print film, and intermediate film.

* * * * *